United States Patent [19]

Kammoto

[11] Patent Number: 4,516,174
[45] Date of Patent: May 7, 1985

[54] VIDEO SIGNAL REGULATING APPARATUS

[75] Inventor: Yoshiaki Kammoto, Tokyo, Japan

[73] Assignee: Ricoh Company, Ltd., Tokyo, Japan

[21] Appl. No.: 235,464

[22] Filed: Feb. 17, 1981

[30] Foreign Application Priority Data

| Mar. 10, 1980 | [JP] | Japan | 55-29887 |
| Mar. 12, 1980 | [JP] | Japan | 55-31272 |
| Apr. 10, 1980 | [JP] | Japan | 55-47367 |

[51] Int. Cl.³ .............................................. H04N 1/40
[52] U.S. Cl. ...................................... 358/282; 382/53
[58] Field of Search ................ 358/280, 282, 284; 235/455; 340/146.3 AG; 328/147, 173, 135; 307/358; 455/602; 382/53, 54

[56] References Cited

U.S. PATENT DOCUMENTS

| 3,159,815 | 12/1964 | Groce | 358/282 |
| 3,379,826 | 4/1968 | Gray | 358/282 |
| 3,388,257 | 6/1968 | Ten Eyck | 455/602 |
| 3,415,950 | 12/1968 | Bartz et al. | 358/280 |
| 3,443,026 | 5/1969 | Townsend | 358/282 |
| 3,472,958 | 10/1969 | Estock | 358/282 |
| 3,626,092 | 12/1971 | Wilson | 358/280 |
| 3,796,866 | 3/1974 | McClellan | 358/282 |
| 3,867,569 | 2/1975 | Watson | 358/293 |
| 4,263,522 | 4/1981 | Jensen | 307/358 |
| 4,272,789 | 6/1981 | Biron | 358/282 |
| 4,276,568 | 6/1981 | Wischer | 358/282 |
| 4,351,004 | 9/1982 | Choate et al. | 358/282 |

OTHER PUBLICATIONS

Smith-Reflective Document Detector-IBM Tech. Discl. Bull., vol. 23-No. 1-Jun. 1980, pp. 137-138.

Primary Examiner—Joseph A. Orsino, Jr.
Attorney, Agent, or Firm—David G. Alexander

[57] ABSTRACT

A sensor ($S_1$) is provided in a reflector (23) which reflects light from a lamp (21) to illuminate an original document (24) for scanning. A light image of the document (24) is scanned by an optoelectronic scanning array (28) which produces video signals corresponding thereto. The sensor ($S_1$) is so located as to receive light both directly from the lamp (21) and reflected from the document (24) so as to produce an output signal corresponding to a combined function of the background density of the document (24) and the intensity of the lamp (21). This sensor output is used to control the amplification factor of an amplifier (29) which amplifies the video signals so as to maintain a constant average level of the output thereof.

The background level is removed from the video signals by a peak hold circuit (32) and an operational amplifier (34) which subtracts the video signals from the output of the peak hold circuit (32). The peak hold circuit (32) also combine the video signals with a reference value. A variable voltage divider (37) is connected to the output of the operational amplifier (34) and is manually variable to compensate for various types of document patterns such as hairlines, handwritten characters and the like.

6 Claims, 19 Drawing Figures

Fig. 12  A  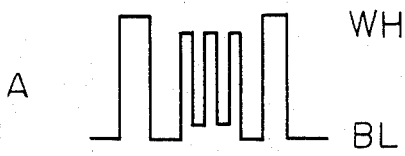
Fig. 13  B  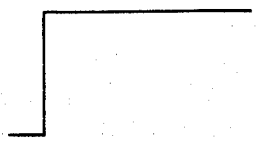
Fig. 14  F  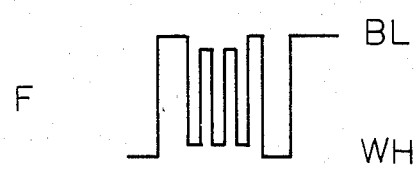
Fig. 15  Da  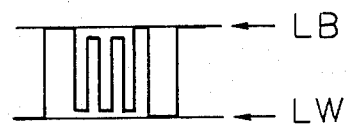
Fig. 16  Db  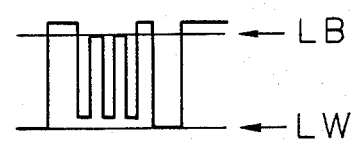

INPUT

OUTPUT

VIDEO SIGNAL REGULATING APPARATUS

BACKGROUND OF THE INVENTION

The present invention relates to an apparatus for regulating video signals produced by scanning an original document which has an optical image pattern thereon.

A copying machine or a facsimile transceiver for instance includes an image input device for scanning an image pattern on a document on a glass platen using a CCD solid state image array or the like. Generally, the level of the video signals produced by such an array varies with the density level of the background of the document as well as the amount of light emitted by illumination lamps. For this reason, regulation of the video signals is necessary.

It has been practiced to detect the peak level of the video signals, or the density level of the background of the document, and regulate the video signals while variably setting an image signal level which is about 50% of the detected peak level. However, this regulation process is effective only on a two-value basis and cannot cope with fluctuations in the amount of light from the lamps or changes in the background density level when regulation is desired on a multi-value basis.

For multi-value regulation of video signals, there has been employed a process wherein given image signal levels of different densities are determined in advance and a sensor senses the amount of light output of the lamps so that each of the image signal levels may be suitably modulated in accordance with the sensor output to compensate for changes in the amount of light output. This process, however, cannot cope with variations in the density of the background area of the document. Since the background level differs a great deal from documents of one kind to those of another kind, the process mentioned above tends to erroneously determine the background of one document as an image area when regulating the video signals.

In the present type of apparatus, it is generally practiced to remove a background density level from the video signals so that an image free from contamination in the background areas may be reproduced.

A conventional expedient for the removal of the background is offsetting the reference point of the video signals by the background level expected in advance. However, this expedient fails to readily and properly remove the background in for a document whose background density may vary over a wide range. Particularly, where a document has an uneven density distribution in its background area, the expedient mentioned above cannot follow the difference in density and results in irregularity in the removal of the background whereby the background area of a reproduced image is partly contaminated, degrading the quality of the image.

Video signals read by a CCD or PDA solid state scanning element through photoelectric conversion corresponding to density information have traditionally been processed into two different binary values by simply discriminating the video signals in an analog fashion with respect to a certain slice level. However, a predominant method practiced today for binary processing is to transform the video signals into digital values through an analog-to-digital converter, process the digital signals in various ways using multi-value conditions, and then convert the digital signals into binary form.

Conventionally, a white level (zero) reference and a black (maximum value) reference have been determined for the analog-to-digital conversion of video signals by detecting the zero value and peak value of the video signals (as disclosed in Japanese Unexamined Patent Publication No. 55-5582). This system involves problems as will be discussed hereinafter. Where a document such as printed matter has handwritten characters which are different in density from printed characters or hairlines which have high spatial frequencies even if of the same density level, the photoelectric conversion will produce video signals which are uneven in output level as indicated in FIG. 10. When the peak value $V_P$ of the video signals is detected and employed as a black level reference for analog-to-digital conversion according to the quantitizing system mentioned above, an output level $V_A$ corresponding to a hairline and an output level $V_B$ corresponding to handwritten characters will be quantitized individually into different digital values. The result is that, when an image is to be reproduced on the basis of the video signals, the achievable quality of the reproduced image becomes poor.

SUMMARY OF THE INVENTION

An input video signal regulating apparatus embodying the present invention includes a lamp for illuminating an original document, optoelectronic scanning means for scanning the document and producing electrical video signals corresponding to an optical pattern thereof and amplifier means for amplifying the video signals, and is characterized by comprising sensor means disposed so as to receive reflected light from the document and direct light from the lamp and being connected to the amplifier means in such a manner as to vary an amplification factor of the amplifier means in accordance with an output of the sensor means to regulate a level of the video signals to a constant value. Peak hold means detect and hold a peak of the video signals representing a background area of the document, and operational amplifying means subtract the video signals from an output of the peak hold means and produce output signals corresponding to a difference therebetween.

In accordance with the present invention, a sensor is provided in a reflector which reflects light from a lamp to illuminate an original document for scanning. A light image of the document is scanned by an optoelectronic scanning array which produces video signal corresponding thereto. The sensor is so located as to receive light both directly from the lamp and reflected from the document so as to produce an output signal corresponding to a combined function of the background density of the document and the intensity of the lamp. This sensor output is used to control the amplification factor of an amplifier which amplifies the video signals so as to maintain a constant average level of the output thereof. The background level is removed from the video signals by a peak hold circuit and an operational amplifier which subtracts the video signals from the output of the peak hold circuit. The peak hold circuit may also combine the video signals with a reference value. A variable voltage divider is connected to the output of the operational amplifier and is manually variable to compensate for various types of document patterns such as hairlines, printed characters and the like.

It is therefore an object of the present invention to provide a video signal regulating apparatus which, when regulating video signals, can perform regulation while compensating for a change in the level of the background density simultaneously with a change in the amount of light from illumination lamps and can operate with a simple construction.

In accordance with the present invention, the apparatus includes a single sensor capable of sensing light reflected from an original document and light from illumination lamps at the same time and, according to an output of the sensor, cause an optimum video signal level to be determined automatically for regulating image information read by a CCD solid image pick-up element or the like.

It is another object of the present invention to provide a background removing circuit which causes the reference point of video signals to become offset following changes in the level of the background density.

It is another object of the present invention to provide a density level compensation circuit for video signals which can reproduce excellent images by compensating the density of low density images when a document has different black levels of information such as printed letters and handwritten letters together and, at the same time, improving reproducibility of hairlines when a document has hairlines whose density may be the same as other characters. In order to achieve this object, a density level compensation circuit of the present invention causes an analog-to-digital converter to perform optimum quantization in accordance with such specific conditions of an image pattern on a document so that the quantized digital value of each image signal always has the same density level.

It is another object of the present invention to provide a generally improved video signal regulating apparatus.

Other objects, together with the foregoing, are attained in the embodiments described in the following description and illustrated in the accompanying drawing.

BRIEF DESCRIPTION OF THE DRAWING

FIGS. 12 to 16 illustrate signals which appear in various parts of the circuit shown in FIG. 11;

DESCRIPTION OF THE PREFERRED EMBODIMENTS

While the video signal regulating apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
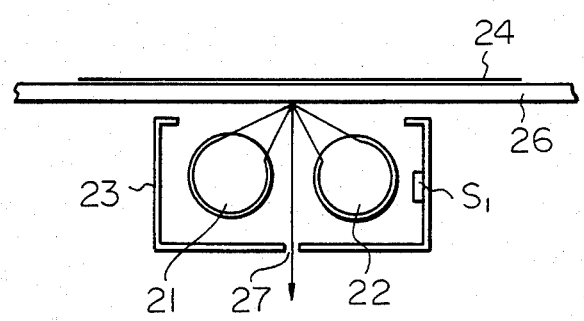
FIGS. 1 and 2 show in front elevation first and second examples of an exposing lamp assembly to which the present invention is applicable.
Figure 2:
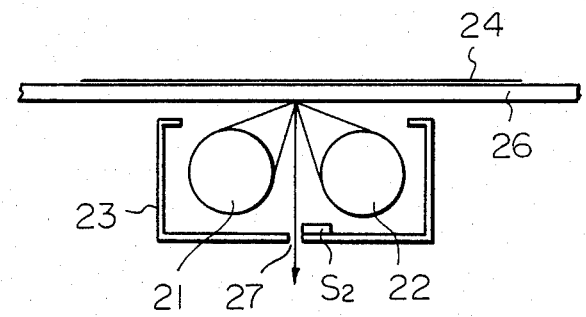

Referring to FIGS. 1 and 2, an apparatus according to the present invention comprises a light sensor $S_1$ (FIG. 1) or $S_2$ (FIG. 2) located in an illumination lamp assembly made up of a pair of fluorescent lamps 21 and 22 and a reflector 23. The sensor $S_1$ or $S_2$ is adapted to sense light emitted by the lamps 21 and 22 and light reflected from a document 24 on a glass platen 26 at the same time. In FIG. 1, use is made of aperture type fluorescent lamps 21 and 22 so that reflected light from the document 24 may be incident on the sensor $S_1$ through the fluorescent surfaces. The sensor $S_2$ in FIG. 2 assumes a position displaced from the main light path from the document 24 (extending through an opening or slot 27 to a CCD solid state image pick-up array or element 28 or the like).

Figure 3:
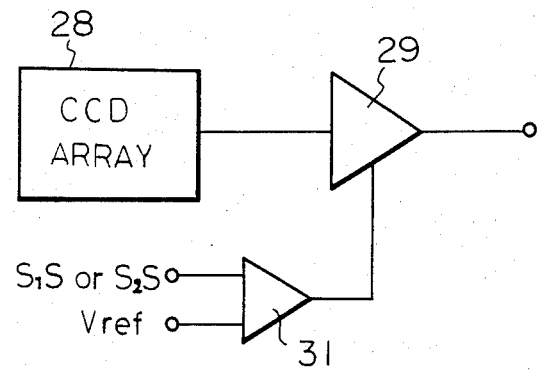
FIG. 3 is a block diagram showing an embodiment of a video signal regulating apparatus according to the present invention.

FIG. 3 shows a circuit arrangement for regulating video signals produced by the CCD solid state image pick-up element 28 in accordance with an output of the sensor $S_1$ or $S_2$. A voltage control amplifier 29 in the circuit serves to regulate video signals fed thereto from the image pick-up element 28 to a predetermined image signal level. A deviation amplifier 31 on the other hand functions to compare an output $S_1S$ or $S_2S$ of the sensor $S_1$ or $S_2$ with a reference voltage $V_{ref}$ and adjust the gain of the amplifier 29 with its deviation output.

In the thus constructed image signal regulating system, the amplifier 31 compares the output $S_1S$ or $S_2S$ of the sensor $S_1$ or $S_2$ with the reference voltage $V_{ref}$ and in this way provides an amount of deviation of the light emitted by the lamps 21 and 22 and an amount of deviation of the background level of the document 24 in combination from the reference value $V_{ref}$.

The output of the amplifier 31 is fed to the amplifier 29 to adjust its gain or amplification factor in accordance therewith. This optimumly adjusts the video signal level and permits automatic compensation for the deviation to occur. For instance, when the amount of light from the lamps 21 and 22 decreases and the background density of the document 24 increases, the output level of the sensor $S_1$ or $S_2$ will decrease as represented by a relation $S_1S$ or $S_2S < V_{ref}$ causing the voltage control amplifier 29 to suitably increase its gain.

An image signal regulating apparatus according to the present invention employs a single sensor for simultaneously detecting an amount of light emitted by illumination lamps and an amount of light reflected from a document. A voltage control amplifier for regulating image signals read by a CCD solid state image pick-up element or the like has its gain adjusted in accordance with a signal representing the deviation between a sensor output and a predetermined reference voltage. It will therefore be seen that the apparatus can compensate for a fluctuation in the amount of light emitted by the lamps and a change in the level of the background of the document at the same time and thereby optimumly regulate the video signals. Also, the apparatus as a whole requires but a simple arrangement.

Figure 4:
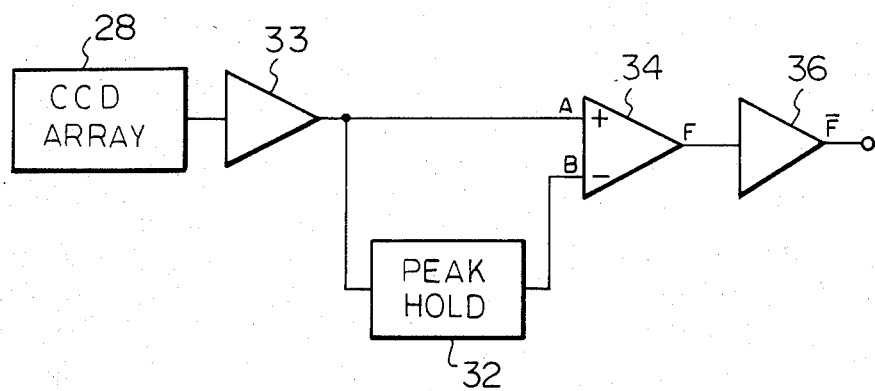
FIG. 4 is a block diagram showing another embodiment of the present invention.

Referring now to FIG. 4, a background removing circuit of the present video signal regulating apparatus comprises a peak hold circuit 32 adapted to detect and hold the peak value of video signals A which have been produced by the CCD solid state image pick-up element 28 and then amplified by a video amplifier 33. The circuit also comprises an operational amplifier 34 which subtracts an output B of the peak hold circuit 32 from the video signals A to provide an output F as expressed by the following equation:

$$F = A - B \qquad (1)$$

This amplifier output F is fed to and inverted in polarity by an amplifier 36.

Figure 5:
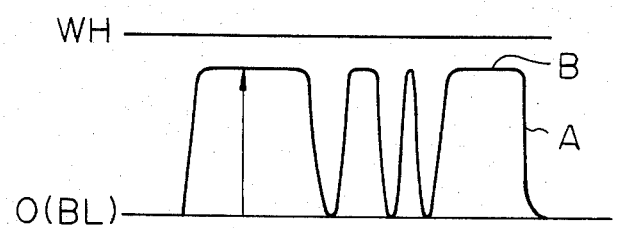
FIGS. 5, 6 and 7 illustrate waveforms of signals which appear in different portions of the circuit of FIG. 4.

Suppose that the image pick-up element 28 associated with the circuit concerned has produced video signals A shown in FIG. 5. In the video signals A, the black level BL in the original image pattern constitutes a zero reference and there appears a difference between the peak voltage B and white level voltage WH, i.e. WH−B, as the background level.

Figure 6:
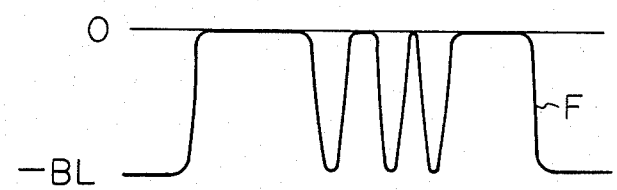
Figure 7:
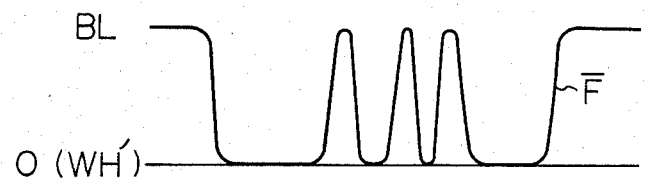

The peak voltage B of the video signals A is detected and held by the peak hold circuit 32. The operational amplifier 34 determines the difference between the output B of the peak hold circuit 32 and the video signals A according to equation (1). The resultant output F of the amplifier 34 has a zero reference consisting of the peak level of the video signals A and black level information BL appearing on the negative (−) side as shown in FIG. 6. Inverting the output F, the amplifier 36 produces at its output signals F as shown in FIG. 7 which are different from the original video signals A in that the background level (WH−B) is absent and a white level WH′ constitutes a zero reference.

It will thus be appreciated that, despite any difference in the background levels of documents or any change in the background level of a single document, the circuit of the invention promotes effective removal of the background level. It will be needless to mention that the polarity inversion performed by the amplifier 36 on the amplifier output F is needless if an arrangement capable of handling negative (−) signals is provided to circuitry which follows the background removing circuit to perform quantitization and like operations on the processed video signals which are free from the background level.

Figure 8:
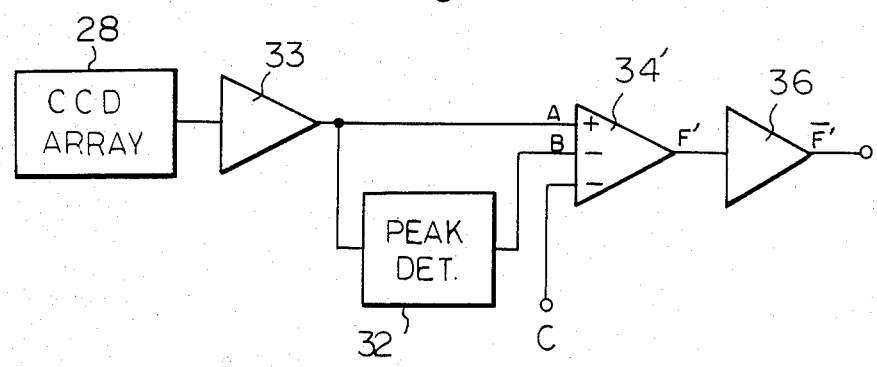
FIG. 8 is a block diagram showing a modified form of the present invention.
Figure 9:
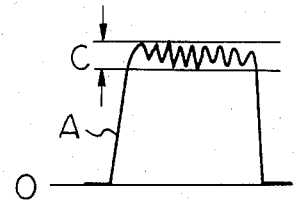
FIG. 9 shows a waveform of an exemplary input image signal.
Figure 10:
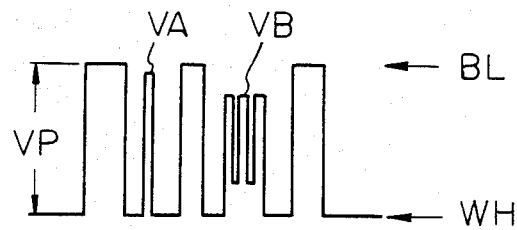
FIG. 10 shows an image signal which has different density levels corresponding to the characteristics of various portions of an image pattern on a document.

A modified form of the circuit shown in FIG. 4 is illustrated in FIG. 8. The video signals from the image pick-up element 28 may have a peak level (background level) which includes a high frequency component and has irregularity as indicated in FIG. 9. The modified design in FIG. 8 is to preclude influence of the irregularity in the background level. As shown, a predetermined compensating voltage C (see FIG. 9) is supplied from externally to an operational amplifier 34′ which then produces an output F′ after an operation expressed as follows:

$$F = A - (B + C) \qquad (2)$$

Thus, the operational amplifier 34′ compensates for the irregularity in the background level and thereby optimumly removes the background level.

A background removing circuit of the present invention includes a peak hold circuit for detecting the peak value of video signals produced by an image pick-up element and having a black level as their reference, and a subtractor adapted to subtract the voltage held by the peak hold circuit from the input video signals, thereby transforming the original video signals into video signals which are free from the background level and have a white level as their reference. The circuit of the invention can thus follow and effectively remove changes in the background level.

Figure 11:
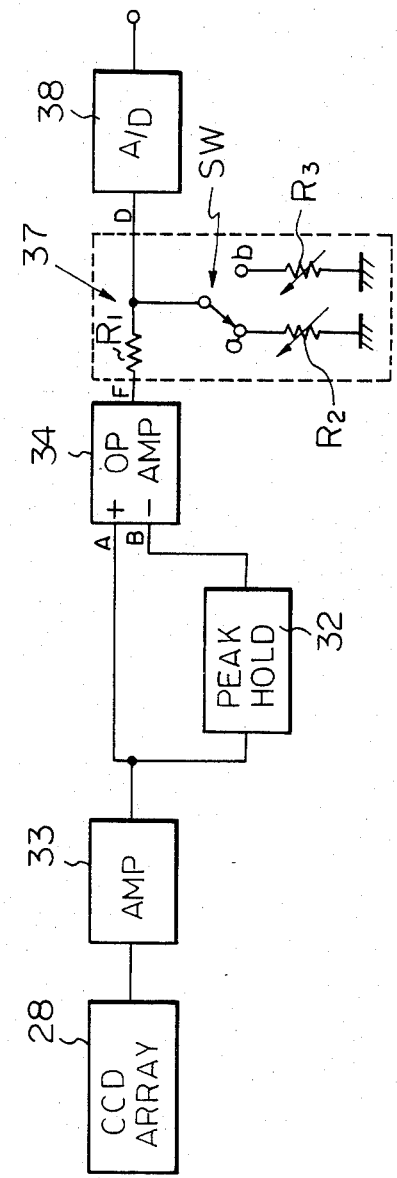
FIG. 11 is a block diagram showing another embodiment of the present invention.

Referring now to FIG. 11, there is shown a density level compensation circuit according to the present invention. The output signals F of the operational amplifier or subtractor 34 are coupled to a level setting unit 37 which comprises a variable negative amplification rate or voltage divider circuit and suitably adjusts the level of the subtractor output F to set the level of the output signals which will be fed to an analog-to-digital converter 38 (which has a fixed quantitizing level in this embodiment). As shown in the drawing, the level setting unit 37 has a resistor $R_1$ which is selectively connectable with first and second variable resistors $R_2$ and $R_3$ through contacts a and b of a switch SW. This permits suitable selection of the value of an output D which is the voltage divided version of the input F.

The density level compensation circuit thus arranged operates as follows.

Figure 17:
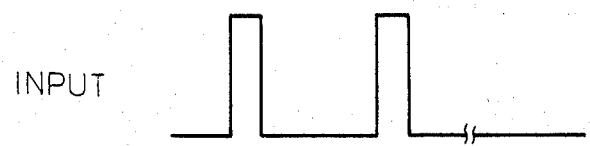
FIGS. 17 and 18 show operational characteristics of a peak detector included in the circuit of FIG. 11.
Figure 18:
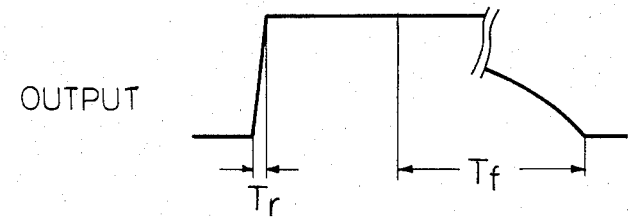

Referring also to FIGS. 10 and 12 to 16, when the solid state scanning array 28 scans the surface of a document carrying an image pattern thereon, the amplifier 33 produces the video signals A which have undergone photoelectric conversion in proportion to white information and have a black level as their reference. It will be noted that the black level reference in the video signals A fluctuates depending on the density of black information which may take the form of printed characters or handwritten characters on a document for example. The peak hold circuit 32 detects the peak value $V_P$ of the video signals A whereupon the subtractor 34 subtracts the amplifier output A from the peak hold output B. Then, video signals having a white level as their reference appear as the output F of the subtractor 34 as indicated in FIGS. 12 to 14. As viewed in FIGS. 17 and 18, the peak hold circuit 32 has a time constant such that its output rises in a short time period $T_r$ in response to an input signal but falls through a sufficiently long time period $T_f$. Thus, the peak hold circuit 32 quickly detects the peak value of the video signals A and holds the detected peak value for a predetermined period of time whereby the peak value is processed into a white level reference of the video signals F. Then the signals F are applied to the level setting unit 37 and there subjected to voltage division, the ratio of which is determined by the position of the switch SW, which will have been suitably selected by the operator in accordance with the condition of the image pattern on the document. As a result, level-adjusted video signals D are applied to the analog-to-digital converter 38. Suppose that the resistance of the resistor $R_2$ in the unit 37 is larger than that of the resistor $R_3$. If the switch SW is in connection with the contact a, the peak level of an image signal Da appearing from the unit 37 will coincide with a predetermined highest quantitizing level (black level reference) $L_B$ of the analog-to-digital converter 38 as shown in FIG. 15 and intermediate hairline images $V_A$ will be quantitized by the converter 38 to relatively small values. If the switch SW is in connection with the contact b on the other hand, the output level of the unit 37 will become higher than the case mentioned above whereby image signals Db appearing from the unit 37 will have a peak level higher than the highest quantitizing level $L_B$ of the converter 38 and an intermediate hairline level coincident with the level $L_B$. The converter 38 will determine signals higher than the reference level $L_B$ as black level information and quantitize them to a common value. In FIGS. 15 and 16, $L_W$ indicates a white level reference of the analog-to-digital converter 38.

In this way, the density level compensation circuit of the invention has the resistances of its variable resistors in the level setting unit 37 suitably determined to cope with hairlines, handwritten characters and other various kinds of information which are expected to be found on documents. Under these conditions, the operator manually sets the switch SW to meet specific conditions of an image pattern on a document. Then, the video signals F will be optimumly quantitized despite any fluctuation in their black level and with the quantitizing level of the analog-to-digital converter 38 fixed, so that the density level of the video signals F can be properly compensated.

Figure 19:
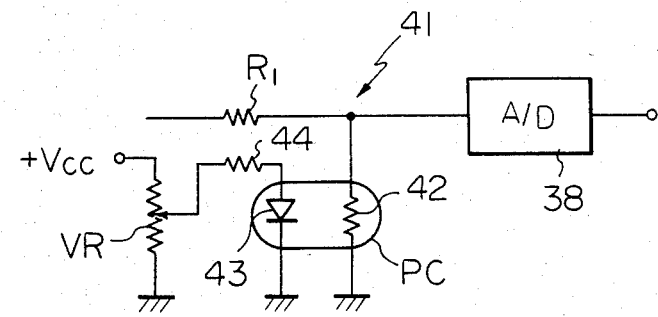
FIG. 19 is a diagram showing an alternative to a level setting unit also included in the circuit of FIG. 11.

An alternative arrangement of the level setting unit 37 is illustrated in FIG. 19. An alternative unit 41 includes a variable resistor or potentiometer VR whose resistance can be varied steplessly to select a desired level of the output signals D. A photocoupler PC may be installed as shown to disconnect the variable resistor VR from the major circuitry in order that the density level can be remote-controlled as in a copying machine.

The resistor $R_1$ is connected in series with a light receiving element 42 of the photocoupler PC whereas the slider of the potentiometer VR is connected through a resistor 44 to a light emitting element 43 of the photocoupler PC to vary the amount of current flow therethrough and thereby the amount of light emitted by the element 43 and the resistance of the element 42.

A density level compensation circuit according to the present invention processes video signals produced by a scanning element through photoelectric conversion which have a black level as their reference by detecting the peak value of the video signals and then subtracting the video signals from the detected peak value, thereby providing video image signals having a white level as their reference. When causing an analog-to-digital converter to quantitize the processed video signals, the circuit suitably adjusts the maximum quantitizing level through a level setting unit which comprises a variable amplification rate circuit. It will thus be seen that the circuit of the invention promotes optimum quantization in comformity with specific conditions of an image pattern on an original document. This well reproduces hairline images while compensating the density of low density images and thereby reproduces images of excellent quality.

Various modifications will become possible for those skilled in the art after receiving the teachings of the present disclosure without departing from the scope thereof.

What is claimed is:

1. A video signal regulating apparatus including a lamp for illuminating an original document, optoelectric scanning means for scanning the document and producing electrical video signals corresponding to an optical pattern thereof and amplifier means for amplifying the video signals, characterized by comprising:

sensor means comprising a single sensor which is disposed so as to simultaneously receive reflected light from the document and light from the lamp and being connected to the amplifier means, the amplifier means being constructed such that an amplification factor thereof varies in accordance with an output of the sensor means to regulate a level of the video signals to a constant valve.

2. An apparatus as in claim 1, further comprising a reflector for reflecting light from the lamp to the document and being formed with an opening through which a light image of the document passes to the scanning means.

3. An apparatus as in claim 2, in which the sensor means is disposed inside the reflector closely adjacent to the opening.

4. An apparatus as in claim 2, in which the sensor means is disposed inside the reflector on a side wall thereof.

5. An apparatus as in claim 1, in which the amplifier means is further constructed to receive a reference voltage and regulate the amplification factor of the amplifier as a predetermined function of the output of the sensor means and the reference voltage.

6. An apparatus as in claim 5, in which the predetermined function comprises comparison.

* * * * *